Dec. 15, 1931.  J. R. JACKSON, JR  1,836,972

ELEVATOR

Original Filed Sept. 5, 1928    4 Sheets-Sheet 1

Fig.1.

INVENTOR:
Joseph R. Jackson, Jr.
BY Henry T. Williams.
ATTORNEY

Dec. 15, 1931. J. R. JACKSON, JR 1,836,972
ELEVATOR
Original Filed Sept. 5, 1928 4 Sheets-Sheet 3

Fig. 4.

INVENTOR:
Joseph R. Jackson, Jr.
BY
ATTORNEY

Dec. 15, 1931.  J. R. JACKSON, JR  1,836,972

ELEVATOR

Original Filed Sept. 5, 1928    4 Sheets-Sheet 4

INVENTOR:
Joseph R. Jackson, Jr.
BY Henry T. Williams
ATTORNEY

Patented Dec. 15, 1931

1,836,972

UNITED STATES PATENT OFFICE

JOSEPH R. JACKSON, JR., OF BOSTON, MASSACHUSETTS

ELEVATOR

Application filed September 5, 1928, Serial No. 304,018. Renewed May 5, 1931.

The invention to be hereinafter described relates to electric elevators.

In my copending application Serial No. 233,119, filed November 14, 1927, is shown an elevator having a car provided with a machine which weighs the load on the car, and this machine is utilized automatically to regulate certain instrumentalities of the elevator system including the speed of the car operating electric motor, the dynamic brake, and the mechanical brake.

In effecting the regulation by the weighing machine, series of resistances are employed in the circuits for said instrumentalities, a position machine is provided in the penthouse for rendering the various resistances effective, and a selector device is employed for controlling the position machine, said selector device being mounted on the elevator car and operated by the weighing machine, suitable conductors being employed for connecting the selector device on the car with the position machine in the penthouse. A purpose of the present invention is to provide improved means for regulating the speed of the car operating motor and the force of application of the dynamic and mechanical brakes. This may be accomplished either automatically by weighing the load on the car or manually by the car operator estimating the load on the car. In providing for this regulation, account is taken of the resultant force due to the weight of the car, the varying load thereon, and the counterweight for the car.

In carrying the invention into practical effect, the regulation initiated at the car and transmitted to the car operating mechanism in the penthouse utilizes an alternating current self-synchronizing or "selsyn" system for the transmission of angular motion.

The character of the invention will be best understood by reference to the following description of one good embodiment of the invention shown in the accompanying drawings, wherein.

Referring to the drawings, the elevator shown therein as one good embodiment of the invention, comprises the car 1 in the hatchway 3 and suspended by cables 5 which pass around the drum 7 in the penthouse, said cables passing downward from the drum into the hatchway where they are connected to the counterweight 9. The drum is driven by an electric motor 11 provided with a mechanical brake 13 comprising shoes 15 at the lower ends of levers 17 pivoted intermediate their ends. At the upper ends of said levers are holes receiving a rod 19 carrying coil springs 21 confined between said levers and nuts 23 on the rod. The construction is such that the springs tend to apply the brake. To release the brake, an electro-magnet 25 is provided having cores connected by links 27 with the upper ends of the levers 17, the construction being such that on energization of the magnet the levers will be rocked against the opposition of the springs 21 and release the shoes from the drum.

To vary the force of application of the mechanical brake, an electromagnet 29 is provided having cores connected to rods 31 carrying coil springs 33 confined between nuts 35 and arms 37 which are pivotally connected to the links 27, referred to, and have their lower ends fulcrumed on brackets 39 on the casing of the magnet 25. The construction is such that on energization of the magnet 29, the arms 37 will be rocked toward each other and against the opposition of the brake springs 21, thereby to reduce the force of application of said brake.

Figures 9, 10, 11:
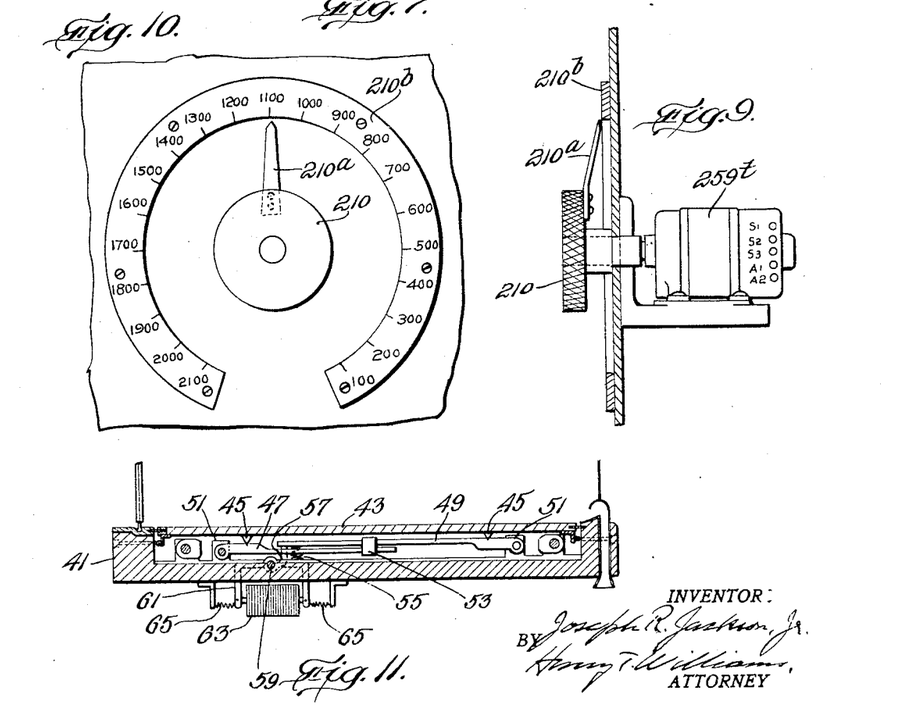
Fig. 9 is a side elevation of the transmitting selsyn motor on the car equipped for manual operation of its rotor, and an indicator associated therewith.
Fig. 10 is a view looking toward the right of Fig. 9.
Fig. 11 is a vertical section through the car base showing the weighing machine thereon.

Next will be described the weighing machine on the car, more particular reference being had to Fig. 11. The car has a base 41 containing a shallow chamber in which is a platform 43 which may serve as the car floor. Projecting down from the platform are wedge-shaped lugs 45 resting on similarly-shaped seats on yokes 47 and 49 of the weighing machine suspension, said yokes having ends pivotally mounted in bearings 51 and arms connected by a ring 53, a coil spring 55 being interposed between the yoke 49 and the bottom of the chamber which tends to rock the yokes upwardly and is adapted to yield when a load is placed upon the platform. The yoke 49 has a seat in the under side thereof engaged by a finger 57 on a rock shaft 59 projecting out beyond one side of the car, as will be noted in Fig. 4. To lock the weighing machine, the rock shaft 59 is provided with a cylindrical enlargement, and cooperating therewith are clamp shoes carried by levers 61 pivotally mounted on the base and connected to cores of an electric magnet 63 carried by and beneath the car base, coil springs 65 being connected to said levers and brackets on the base. The construction is such that when the magnet is energized, the shoes will be released. Since the weighing machine may be the same as that disclosed in my said application Serial No. 233,119, it is unnecessary to show and describe the same further in detail herein.

The weighing machine will operate in response to the load on the platform to rock the shaft 59 referred to, and the motion thus produced may be utilized to regulate instrumentalities of the elevator to be described.

Mounted on the car is the usual emergency or safety switch 103, which when closed completes a circuit traced through main positive line 101, wire 102, switch 103, wire 104, magnet 105, wire 106, and main negative line 107. The magnet 105 when energized by completing this circuit, closes the main line switches 109 and 120 in order that the elevator system may be ready for operation.

The circuit for the field of the elevator driving motor is traced through main line 101, wire 108, switch 109, wires 110, 167, 168, 169, 170 and 171, the usual master magnet switch 172, contact 173, wires 174 and 175, field coil 176, wire 177, resistance bank 178, wires 179 and 119, switch 120, and main line 107. In starting and stopping the elevator motor the field coil 181 is cut out by the master magnet switch 172, and after the motor attains normal speed, the master magnet switch is opened, and the current passes through the field coils 181 and 176 in series.

The circuit for the armature of the elevator driving motor for up-travel of the car is traced through main line 101, wire 108, switch 109, wires 110, 167 and 168, switch 201, wires 202 and 203, starting resistance 204, wires 205 and 206, to one of the brushes of the motor. The circuit continues from the other brush through wires 208, 209 and 209a, switch 210, wires 210a, 132 and 119, switch 120 and main negative line 107.

The armature circuit for down travel of the car is traced through main line 101, wire 108, switch 109, wires 110, 167 and 265, switch 267, wires 268, 209 and 208, to one of the brushes of the motor. The circuit continues from the other brush to wires 206, 205, resistance 204, wires 203 and 269, switch 270, wires 131, 132 and 119, switch 120 and main line 107.

The circuit for energizing the magnet 128 to close the up-travel switches 201 and 210 in the elevator motor circuit is traced through main line 101, wire 108, switch 109, wires 110 and 111, switch 112 at the transmitting selsyn motor on the car, to be more fully hereinafter described, wire 113, switch 114 on the car, contact 122, wire 123, hand lever 124 on the car, contact segment 125, wires 126 and 127, magnet 128, wires 129, 130, 131, 132 and 119, switch 120, and main line 107.

The circuit for energizing the magnet 135 to close the down-travel switches 267 and 270 in the elevator motor circuit, is traced through main line 101, wire 108, switch 109, wires 110 and 111, switch 112 at transmitting selsyn motor on the car, wire 113, switch 114, wire 123, hand lever 124, contact segment 133, wire 134, magnet 135, wires 136, 130, 131, 132 and 119, switch 120 and main line 107.

Thus it will be seen that by shifting the hand lever 124 in the car into engagement with contact segment 125, the up-switches 201 and 210 will be closed to establish the circuit for causing the elevator motor to be driven in a direction for up-travel of the car, and when the hand lever is shifted into engagement with the contact segment 133, the down-switches 270 and 267 will be closed to establish the circuit for causing the elevator motor to be driven in a direction for down-travel of the car.

The starting or accelerating resistance 204 is varied through switches which are operated in sequence to reduce the resistance in the elevator motor circuit in stages. When the motor is up to normal speed, all of this resistance is cut out. The dynamic brake resistance 216 is shunted across the armature, and a portion of this resistance is utilized to by-pass a portion of the current to the motor in starting. Otherwise it will be necessary to employ a line resistance larger than the resistance 204. In starting the motor the full line resistance 204 is in force, and therefore, the current to the armature is reduced, and by increasing the dynamic resistance, a greater amount of the current is sent through the armature. When the line resistance is cut out and full current is on the motor, the dynamic resistance is cut out and has no effect.

The switches which are operated to reduce the resistance in stages, comprise the switches 213, 219 and 224. The switch 213 cooperates with contacts 212 and 214, the switch 219 cooperates with contacts 218 and 220, and switch 224 cooperates with contacts 223 and 225. At the time of starting the elevator motor, the switch 213 does not engage contact 212, and engages contact 214, the switch 219 does not engage contact 218 and engages contact 220, and the switch 224 does not engage contact 223 and engages contact 225. The circuit including the dynamic resistance is traced from the line resistance 204 through wire 206a, switch 213, contact 214, wire 215, dynamic resistance 216, wires 227, 217 and 209, thence through wire 209a, switch 210, wires 210a, 132 and 119, switch 120, and main line 107.

The stages of the resistance 204 are 204a, 204b and 204c. To cut out the first stage resistance 204a, the switch 213 is moved by its usual magnet into engagement with the contact 212. As the portion 204a of the line resistance is cut out, the switch 213 disengages contact 214, and an additional resistance is brought into the dynamic resistance, and the circuit therefor is traced through wire 206a, switch 219, contact 220, wire 221, resistance 216 and wires 227, 217 and 209, thence through the wire 209a, switch 210, wires 210a, 132 and 119, switch 120, and main line 107.

To cut out the second stage 204b of the line resistance, switch 219 is moved by its usual magnet into engagement with the contact 218. As the portion 204b is cut out, switch 219 disengages contact 220, and an additional resistance is brought into the dynamic resistance, and the circuit therefor is traced through wire 206a, switch 224, contact 225, wire 226, dynamic resistance 216, and wires 227, 217 and 209, thence through the wire 209a, switch 210, wires 210a, 132 and 119, switch 120, and main line 107.

To cut out the last stage 204c of the line resistance, the switch 224 is moved by its usual magnet into engagement with the contact 223. Now the circuit is completed to the armature with the entire line resistance eliminated, and since switch 224 is moved out of engagement with contact 225, the circuit to the dynamic resistance is broken.

As stated, the brake for the elevator car motor is released by the electromagnet 25. The circuit for energizing this magnet for up-travel of the car is traced through main line 101, wire 108, switch 109, wires 110, 167, 168, 168a, switch 201, wires 202, 203 and 238, brake release magnet 25, wires 241, 242, 208, 209, 209a, switch 210, wires 210a, 132 and 119, switch 120 and main line 107.

The circuit for the brake releasing magnet 25 for down-travel of the car is traced through main line 101, wire 108, switch 109, wires 110, 167 and 265, switch 267, wires 268, 209, 208, 242, 241, magnet 25, wires 238, 203 and 269, switch 270, wires 131, 132 and 119, switch 120, and main line 107.

Since the brake release magnet takes its current through the up-switches 201 and 210, and the down-switches 267 and 270, and operation of these switches is controlled by the hand lever 124 in the car, it follows that when said hand lever is moved out of engagement with the contact segments 125 and 133, the up and down switches will be opened, and the circuits to the brake release magnet 25 will be broken, and the springs 21 referred to, will become effective to apply the brake. On the other hand, in starting, either the up or down switch will be closed, and a circuit will be completed to said magnet for releasing the brake.

As stated, the magnet 29 is provided for opposing the force of application of the brake. The circuit for this magnet for up-travel of the car is traced through main line 101, wire 108, switch 109, wires 110, 167, 168, 169 and 243, switch 244 at relay 260, wire 245, magnet 29, wires 247 and 254, contact 248, contact 249 on lever A. A wire 250 leads from the contact 249 to a selector 251.

Figure 4:
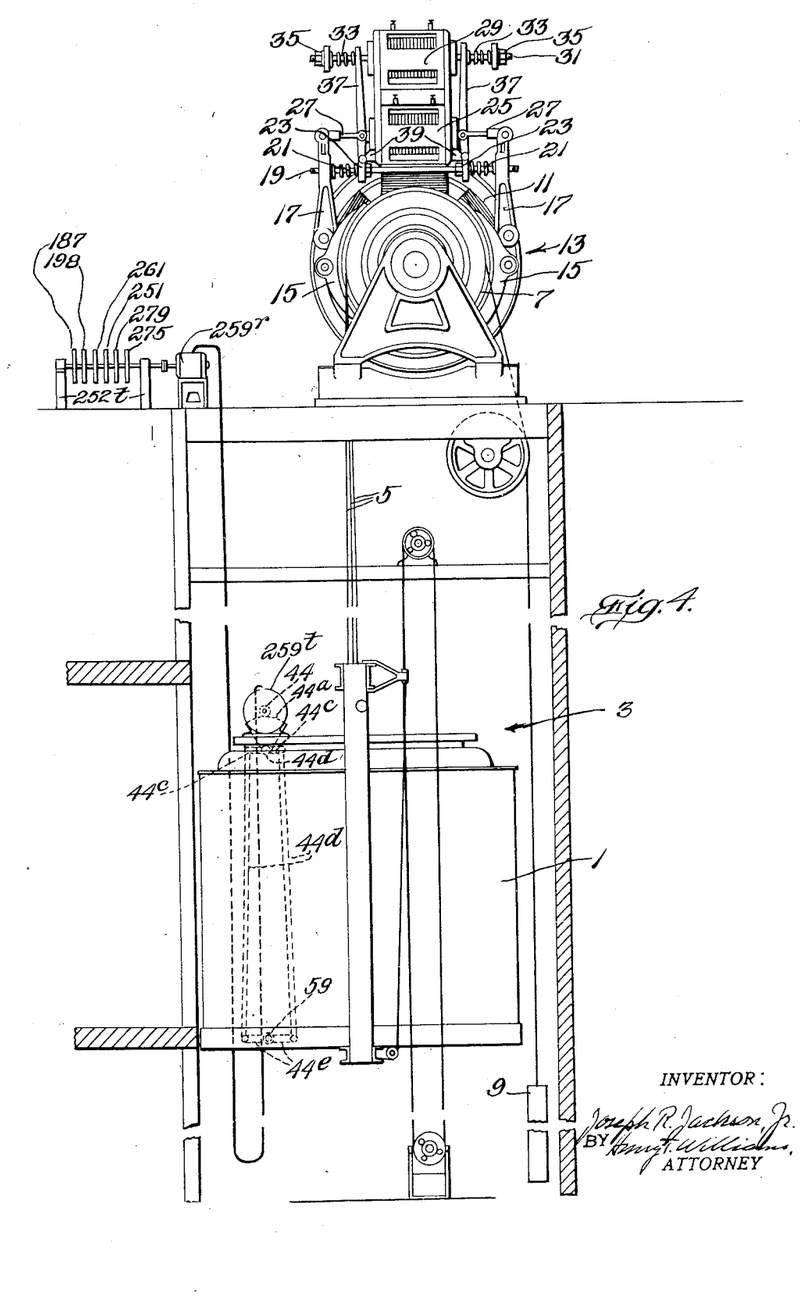
Fig. 4 is a vertical longitudinal section through the elevator, certain parts being shown in elevation.
Figures 5, 6, 7:
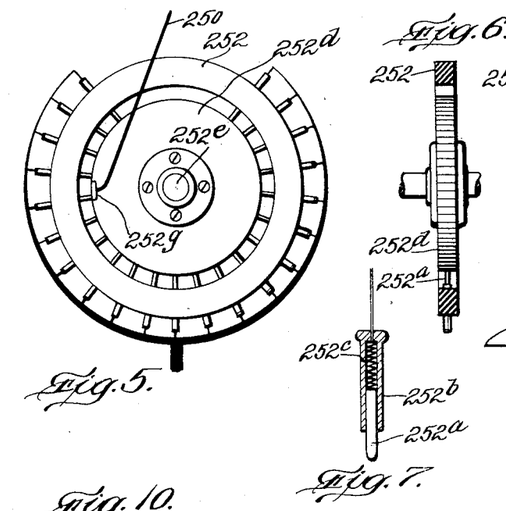
Fig. 5 is a side elevation of one of the selectors.
Fig. 6 is a vertical section through the selector shown in Fig. 5.
Fig. 7 is a sectional view of one of the spring-pressed brushes of the selector.
Figure 8:
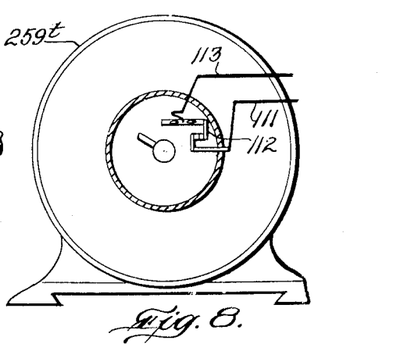
Fig. 8 is a view looking toward an end of the transmitting selsyn motor showing the switch for opening the circuit to prevent travel of the elevator car when overloaded.

There are several of these selectors in the penthouse, and each comprises a stationary ring 252 (Figs. 5, 6 and 7) of insulation material and carrying a series of brushes 252a in sockets 252b and pressed by springs 252c against the periphery of a disk 252d of insulation material, and mounted fast on a shaft 252e journalled in bearings on supports 252f (Fig. 4). The disk 252d carries at the periphery thereof a spot 252g of conductive material and adapted to engage any one of the brushes 252a. The wire 250 leading from the lever A is connected to the conductive spot of the disk of the selector 251.

The brushes are connected by wires in a cable 253 to a series of resistances 254 connected in turn to a bar 255. The circuit is traced from this bar through wires 256, 257, 258 and 119, switch 120 and main line 107.

The circuit for the magnet 29 which opposes application of the brake 13 for down-travel of the car, is traced through main line 101, wire 108, switch 109, wires 110, 167, 169 and 243, switch 244 at relay 260, wire 245, magnet 29, wires 247, 254 and 283, contact 261, and contact 263 on lever A, said contact being connected by wire 265 with the conductor spot on the disk of selector 261. The brushes of this selector are connected by wires in the cable 266 with a series of resistances 267 connected in turn to a bar 268. The circuit is traced from this bar through wires 257, 258 and 119, switch 120 and main line 107.

Figure 3:
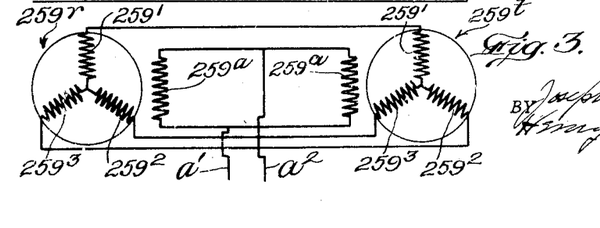
Fig. 3 is a diagrammatic detail of the selsyn motors.

Next will be described the selsyn motor system for imparting angular motion to the disks of the selectors in order that the contact spots of the selectors may be brought into engagement with the lines leading to the particular resistances of the series which are appropriate for the load on the car. This system comprises the transmitting selsyn motor $259t$ mounted on the car and the receiving selsyn motor $259r$ in the penthouse. These motors are provided with single phase windings $259a$ (Fig. 3) on their rotors or armatures, and with poly-circuit windings $259^1$, $259^2$ and $259^3$ on their stators. The poly-phase windings of the two motors may be similar to a poly-phase induction motor or alternating current generator windings. They are here shown as three phase Y connected windings. It will be understood that the armature windings may be mounted on the stators, and the stator windings may be mounted on the rotors if desired. The single phase rotor windings are excited from a suitable source of alternating current supply, in the present instance shown herein as an alternating current generator $259b$ driven by an electric motor $259c$. The circuit for the motor is traced through main line 101, switch 109, wires 110, $259d$, $259e$, 258 and 119, switch 120, and line wire 107. The motor $259c$ and generator $259b$ are located in the penthouse. The selsyn motors are excited by wires $a'$ and $a^2$ leading to the rotors of said motors.

Figure 1:
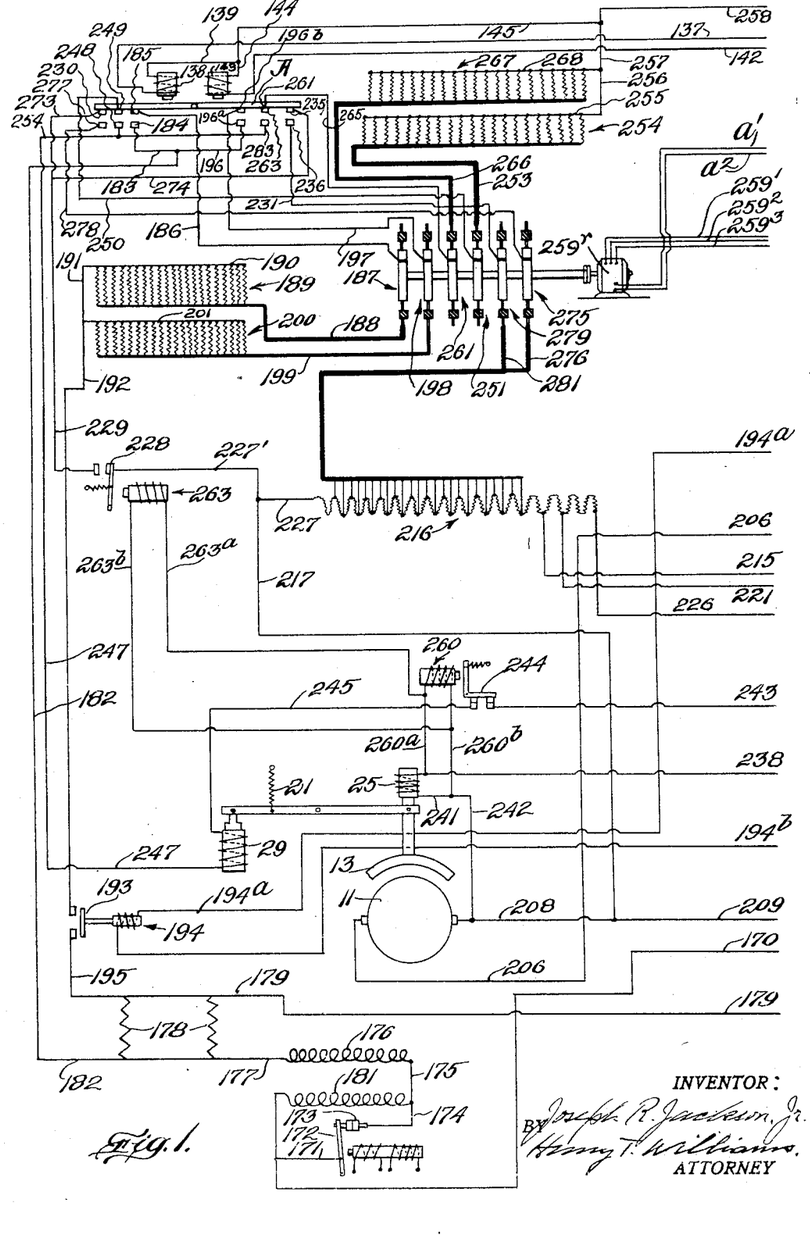
Figs. 1 and 2 show the wiring diagram of the apparatus.
Figure 2:
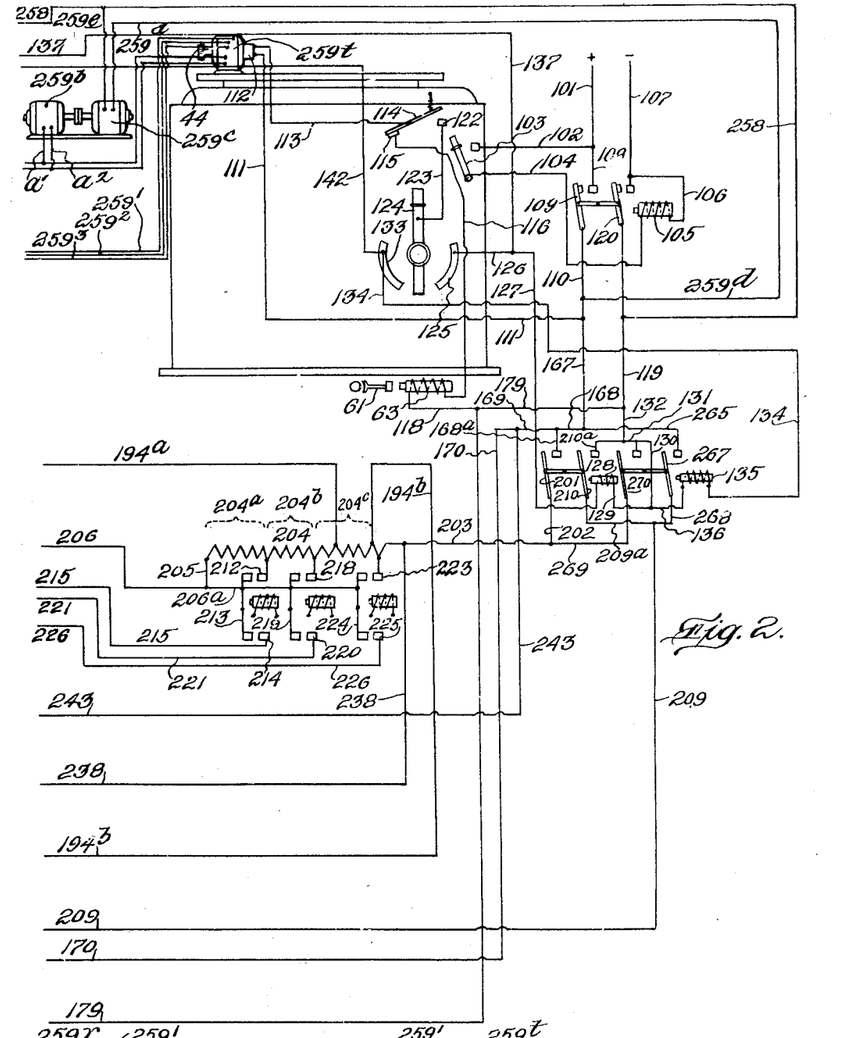

The rotor of the transmitting selsyn motor may receive angular motion through a pinion 44 (Figs. 2 and 4) on the rotor shaft and meshing with a toothed segment $44a$ on a rockshaft $44b$ carrying a pair of arms $44c$ connected by links $44d$ with arms $44e$ on the weighing machine actuated shaft 59 referred to.

The construction is such that the weighing machine will rock the shaft 59 which, through the arms and links described, will rock the toothed segment $44a$ and impart angular motion to the pinion 44 and the rotor of the transmitting selsyn motor. This angular motion in turn will be imparted synchronously to the receiving selsyn motor in the penthouse and to the disks of the selectors.

The circuit for the magnet 29 for opposing application of the brake, should be interrupted on release of the brake on energization of the magnet 25. Accordingly relay 260, referred to, is shunted across the brake release magnet 25 in a circuit traced through wire $260a$ leading from wire 238, through the magnet of relay 260 and wire $260b$ to wire 242.

Having described the mechanical brake and the means for varying its force of application in proportion to the load on the car, next will be described the means for varying the dynamic brake effect in proportion to the load on the car, which is accomplished by variation in the dynamic resistance 216 shunted across the elevator motor armature and regulated by the weighing machine through the selsyn motor system and resistance selectors operated thereby.

The circuit for the dynamic brake for up-travel of the car is traced from resistance 216 through wires 227 and 227', relay switch 228 at relay 263, wires 229 and 273, contact 230 on lever A, contact 277, and wire 278, which leads to the contact spot on the selector 275. Wires in cable 276 lead from the brush of selector 275 to points in the resistance 216.

The circuit for the dynamic brake for down-travel of the car is traced from resistance 216 through wires 227 and 227', switch 228 at relay 263, wires 229 and 274, contact 235 on lever A, contact 236, and wire 231 leading to selector 279. Wires in cable 281 lead from the brushes of this selector to points in the resistance 216.

In each of the two circuits described above for regulation of dynamic resistance, one wire leading from the selector to the resistance 216 is active at a time, and the resistance thus selected will be in proportion to the load on the car. The disks of the selectors 275 and 279 are mounted on the same shaft as the selectors referred to, and therefore, they will receive angular motion as accomplished by the selsyn motor system.

The weighing machine control of the dynamic resistances should be inoperative at all times excepting when the car is approaching a stop. To accomplish this, the switch 228 is provided in the circuits under control of the relay 263 which is energized to open the switch 228 when the circuit is completed to the magnet 25 for releasing the brake. This relay circuit is traced through wires $260a$ and $263a$, coil of relay magnet 263, and wires $263b$ and $260b$ leading to wire 242. When the magnet 25 is de-energized to allow the springs 21 to apply the brake, the relay magnet 263 will be de-energized and the switch 228 will be automatically closed, so that the circuits for the dynamic brake will be in readiness for operation.

Next will be described the circuit for regulating the resistances in the field circuit of the car driving motor to vary the speed of the car for up-travel. This circuit is traced through wire 182 leading from the field coils of the motor through wire 183, contact 184, contact 185 on lever A, and wire 186 leading to the conductor spot of selector 187.

Wires in cable 188 lead from the brushes of the selector 87 to the series of resistances 189 which are connected to a bar 190. The circuit is traced thence through wires 191, 192, switch 193 at relay 194, and wire 195 leading to field resistance 178.

The circuit for regulating the resistances in the motor field circuit for down-travel of the car is traced through wire 182 leading from the field coils of said motor through wire 196, contact 196a, contact 196b on lever A, and wire 197 leading to selector 198. Wires in cable 199 lead from the brushes of the selector 198 to resistances 200 connected in turn to a bar 201. The circuit is traced thence through wire 192, switch 193 at relay 194, and wire 195 leading to resistance bank 178.

The circuits thus described are shunted across the elevator motor field coils, and appropriate ones may be selected to regulate the speed of the motor in response to variations in the load on the car. The disks of the selectors 187 and 198 are mounted on the same shaft as the other selectors referred to, and consequently the selsyn motor system will be effective to transmit angular motion from the car to the rotors of the selectors 187 and 198.

The circuits shunted across the elevator motor field circuit are broken, so that the fixed or standard resistance 178 shall remain unchanged until the motor attains normal speed. To accomplish this, the switch 193 is provided under the control of the relay 194 which is in a circuit including wire 194a connected into an intermediate point in the resistance 204, through a small portion of this resistance and the wire 194b back to the relay 194. When the car starts and current is passing through the resistance 204, a small portion of the current will pass through the relay 194 and open the switch 193 to interrupt the circuits shunted across the motor field. As the last stage of acceleration of the motor is made, the starting resistance is entirely cut out, with the result that the current to the relay 194 is interrupted and the switch 193 is closed, thereby establishing the shunt circuits containing the resistances which are now available to vary the standard or fixed resistance 178 and regulate the speed of the motor.

When the elevator motor circuit is set for up or down travel of the car, the selector control resistance circuits should also be set for up and down travel. Assuming the hand lever 124 in the car to be thrown into engagement with the contact 125 for up-travel, the circuit is traced through contact segment 125, wires 126 and 137, magnet 138 at switch A, wires 139, 145, 258 and 119, switch 120 and main line 107. This will energize the magnet 138 and rock the lever A so as to complete the circuits for resistances to be brought into play for variation of the car speed, the force of the dynamic brake, and the force of the mechanical brake for up-travel of the car.

Assuming the hand lever 124 in the car is to be thrown into engagement with contact segment 133 for down-travel of the car, the circuit is traced through contact segment 133, wire 142, magnet 143 at switch A, wires 144, 145, 258 and 119, switch 120, and main line 107. This will energize the magnet 143 and rock the switch A into a position to complete the circuits for the resistances in varying the speed of the mechanical brake for down-travel of the car.

Next will be described the means for locking the weighing machine against operation on closure of the gate of the car, and for unlocking said machine on opening of the gate. This means includes the magnet 63 in a circuit traced through wires 101 and 108, switch 109, wires 110 and 111, the switch 112 referred to at the end of the transmitting selsyn motor on the car, wire 113, switch 114 controlled by the car gate, contact 115, wire 116, coil magnet 63, wires 118, 179 and 119, switch 120, and main line 107. The gate cooperates with the switch 114 so that when the gate is open, the switch 114 will be urged by its spring into engagement with the contact 115, thereby completing the circuit to the magnet 63 to release the locking means for the weighing machine. When the gate is closed, the lever 114 is rocked to cause it to engage the contact 122, and to interrupt the circuit to the magnet 63, thereby rendering the locking means effective to lock the weighing machine.

In some instances it may be desirable for the operator of the car manually to actuate the rotor of the transmitting selsyn motor. To accomplish this, a knob 210 (Figs. 9 and 10) may be placed upon the rotor shaft, and a pointer 210a may be secured to said knob and cooperate with a dial 210b marked with graduations and numbers, in the present instance representing weight increments from 100 to 2100 lbs.

The operator of the car may estimate the load and then turn the knob so that the pointer registers with the number on the dial representing the estimated load. The rotor of the receiving selsyn motor will be similarly turned and the disks of the selectors will be properly angularly moved in readiness to bring into play the resistances suitable for the car motor speed, the dynamic brake, and the mechanical brake for that load.

The selsyn motor system constitutes a simple and efficient means for transmitting the regulation initiated on the car to the apparatus in the penthouse. To connect the transmitting and receiving selsyn motors, it is merely necessary to provide the wires $a'$ and $a^2$ to carry the alternating current to the rotors of the selsyn motors from the excitation source in the penthouse, and also to provide the three wires connecting the coils of the stators. These wires may be enclosed in a cable carried from the car to the penthouse.

While the selsyn motor system is shown herein as employed in the regulation of the speed of the elevator driving motor, and the force of the dynamic and mechanical brakes, it will be understood that said system might be employed for actuating other instrumentalities of an elevator system under the control from the car either by load weighing means or manually operable means.

It will be understood that the invention is not limited to the specific embodiment shown, and that various deviations may be made therefrom without departing from the spirit and scope of the appended claims.

What is claimed is:

1. In an elevator, the combination of a car, an electric motor for causing the car to travel in the elevator hatchway, and means for regulating the speed of the motor including a selsyn motor system having its transmitting motor on the car and with its rotor operable in accordance with variations in the load on the car.

2. In an elevator, the combination of a car, an electric motor for causing the car to travel in the elevator hatchway, means on the car for automatically weighing the car load, and means for regulating the speed of the motor including a selsyn motor system having its transmitting motor on the car and with its rotor connected to receive angular motion from the weighing means, thereby to regulate the speed in response to variations in the car load.

3. In an elevator, the combination of a car, an electric motor for causing the car to travel in the elevator hatchway, an electric circuit for the motor including a resistance, and means for varying said resistance to regulate the speed of the motor and including a selsyn motor system having its transmitting motor on the car and with its rotor adapted to be angularly adjusted in accordance with variations in the load on the car.

4. In an elevator, the combination of a car, an electric motor for causing the car to travel in the elevator hatchway, an electric circuit including a resistance shunted across the motor field, and means for varying said resistance to vary the speed of the motor and including a selsyn motor system having its transmitting motor on the car and with its rotor angularly adjustable in accordance with variations in the load on the car.

5. In an elevator, the combination of a car, an electric motor for causing the car to travel in the elevator hatchway, and means for regulating the speed of the motor including a selector comprising a series of brushes and a member movable for contact with said brushes, and a selsyn motor system for actuating said member having its transmitting motor on the car and with its rotor adapted to be angularly adjusted on variation in the car load.

6. In an elevator, the combination of a car, an electric motor for causing the car to travel in the elevator hatchway, and means for regulating the speed of the motor in accordance with variations in the car load including series of resistances shunted across the motor field for up and down travel of the car, selectors for the up and down travel resistances respectively and comprising series of brushes connected to said resistances, and movable members for contact with said brushes, and a selsyn motor system for actuating said members having its transmitting motor on the car and with its rotor adapted to be moved on variations in the load on the car, thereby to select motor resistances suitable for variations in the load on the car driving motor.

7. In an elevator, the combination of a car, an electric motor for causing the car to travel in the elevator hatchway, means on the car for automatically weighing the car load, and means for regulating the speed of the motor including series of resistances in the motor circuit, one for up-travel and the other for down-travel of the car, selectors for the up and down travel resistances respectively and comprising brushes connected to the resistances, movable members for contact with said brushes, and a selsyn motor system for actuating said members and having its transmitting motor on the car and with its rotor connected to receive angular motion from the weighing means.

8. In an elevator, the combination of a car, an electric motor for causing the car to travel in the elevator hatchway, and means for regulating the speed of the motor comprising a series of resistances adapted to be brought in circuit with the motor field winding, and means including a selsyn motor system for selecting any one of said resistances and having its transmitting motor on the car.

9. In an elevator, the combination of a car, an electric motor for causing the car to travel in the elevator hatchway, means on the car for weighing the car load, and means for regulating the speed of the motor comprising a series of resistances adapted to be brought in circuit with the motor field winding, and means including a selsyn motor system for selecting any one of said resistances and having its transmitting motor on the car and with its rotor connected to receive angular motion from the weighing means.

10. In an elevator, the combination of a car, an electric motor for causing the car to travel in the elevator hatchway, a dynamic brake for the motor having a series of resistances adapted to be brought in circuit with the motor armature, and means for selecting any one of said resistances including a selsyn motor system having its transmitting motor on the car.

11. In an elevator, the combination of a car, an electric motor for causing the car to travel in the elevator hatchway, means on the car for weighing the car load, a dynamic brake for the motor having a series of resistances adapted to be brought in circuit with the motor armature, and means for selecting any one of said resistances including a selsyn motor system having its transmitting motor on the car and with its rotor connected to receive angular motion from the weighing means.

12. In an elevator, the combination of a car, a drum for the car supporting cables, a brake for the drum, means for applying the brake, and means for controlling the force of the brake including a selsyn motor system having its transmitting motor on the car.

13. In an elevator, the combination of a car, a drum for the car supporting cables, a brake for the drum, and means for controlling the force of the brake including a selsyn motor system having its transmitting motor on the car and with its rotor adapted to receive angular motion in accordance with variations in the load on the car.

14. In an elevator, the combination of a car, means on the car for weighing the car load, a drum for the car supporting cables, a brake for the drum, and means for automatically controlling the force of the brake including a selsyn motor system having its transmitting motor on the car and with its rotor connected to receive angular motion from the weighing means.

15. In an elevator, the combination of a car, a drum for the car supporting cables, a brake for the drum, mechanical means for applying the brake, electromagnetic means for releasing the brake, electromagnetic means for opposing the force of the mechanical brake applying means, and means for controlling the opposing electromagnetic means including a selsyn motor system having its transmitting motor on the car.

16. In an elevator, the combination of a car, means on the car for weighing the car load, a drum for the car supporting cables, a brake for the drum, mechanical means for applying the brake, electromagnetic means for releasing the brake, electromagnetic means for opposing the force of the mechanical brake applying means, and means for controlling the opposing means including a selsyn motor system having its transmitting motor on the car and with its rotor connected to receive angular motion from the weighing means.

17. In an elevator, the combination of a car, a drum for the car supporting cables, a brake for the drum, mechanical means for applying the brake, electromagnetic means for releasing the brake, electromagnetic means for opposing the force of the mechanical brake, a circuit for the electromagnetic opposing means, a series of resistances adapted to be brought selectively into said circuit, and means for selecting any one of said resistances including a selsyn motor system having its transmitting motor on the car and with its rotor adapted to receive angular motion in accordance with variations in the load on the car.

18. In an elevator, the combination of a car, means on the car for weighing the car load, a drum for the car supporting cables, a brake for the drum, mechanical means for applying the brake, electromagnetic means for releasing the brake, electromagnetic means for opposing the force of the mechanical brake applying means, an electric circuit for the electromagnetic opposing means, a series of resistances for said circuit, and means for selecting any one of said resistances including a selsyn motor system having its transmitting motor on the car with its rotor connected to receive angular motion from the weighing means.

19. In an elevator, the combination of a car, means for arresting the car at floor levels including a dynamic brake, and means for controlling said brake including a selsyn motor system having its transmitting motor on the car and with its rotor adapted to receive angular motion in accordance with variations in the load on the car.

20. In an elevator, the combination of a car, an electric motor for causing the car to travel in the elevator hatchway, an electric circuit including a variable resistance shunted across the motor armature, and means for regulating said resistance including a selsyn motor system having its transmitting motor on the car and with it rotor adapted to receive angular motion in accordance with variations in the load on the car.

21. In an elevator, the combination of a car, an electric motor for causing the car to travel in the elevator hatchway, means on the car for weighing the car load, a circuit for the electric motor including a series of resistances adapted to be brought in circuit with the motor armature, and means for selecting any one of said resistances including a selsyn motor system having its transmitting motor on the car and with its rotor connected to receive angular motion from the weighing means.

22. In an elevator, the combination of a car, an electric motor for causing the car to travel in the elevator hatchway, a drum for the car supporting cables, a mechanical brake for the drum, electromagnetic means for opposing the force of the mechanical brake, a dynamic brake for the motor, and means for controlling the force of the electromagnetic means and the dynamic brake including a selsyn motor system having its transmitting motor on the car and with its rotor adapted to receive angular motion in accordance with variations in the load on the car.

23. In an elevator, the combination of a car, means on the car for weighing the car load, an electric motor for causing the car to travel in the elevator hatchway, a drum for the car supporting cables, a mechanical brake for the drum, electromagnetic means for opposing the force of the mechanical brake, a dynamic brake for the motor, and means for controlling mechanical and dynamic brakes including the selsyn motor system having its transmitting motor on the car and with its rotor connected to receive angular motion from the weighing means.

24. In an elevator, the combination of a car, a drum for the car supporting cables, a brake for the drum, mechanical means for applying the brake, electromagnetic means for opposing the force of the mechanical brake, and means for regulating the force of the electromagnetic means including a series of resistances for the circuit of the electromagnetic means, a selector comprising a series of brushes connected to said resistances, and a member movable into contact with any one of said brushes, and a selsyn motor system for actuating said member having its transmitting motor on the car and with its rotor adapted to receive angular motion in accordance with variations in the load on the car.

25. In an elevator, the combination of a car, a drum for the car supporting cables, a mechanical brake for the drum, electromagnetic means for releasing the brake, electromagnetic means for opposing the force of the mechanical brake applying means, a circuit for the electromagnetic opposing means, a series of resistances for said circuit, a selector comprising a series of brushes connected to said resistances, a member movable into contact with any one of said brushes, and a selsyn motor system for actuating said member and having its transmitting motor on the car and with its rotor adapted to receive angular motion in accordance with variations in the load on the car.

26. In an elevator, the combination of a car, means on the car for weighing the car load, a drum for the car supporting cables, a mechanical brake for the drum, electromagnectic means for opposing the force of the mechanical brake applying means, a circuit for the electromagnetic opposing means, a series of resistances for said circuit, a selector comprising a series of brushes connected to said resistances, and a member movable for contact with any one of said brushes, and a selsyn motor system for actuating said member having its transmitting motor mounted on the car and with its rotor connected to receive angular motion from the weighing means.

27. In an elevator, the combination of a car, an electric motor for causing the car to travel in the elevator hatchway, a dynamic brake for the motor comprising a circuit shunted across the motor armature, a series of resistances for said circuit, a selector comprising a series of brushes connected to said resistances, and a member movable for contact with any one of said brushes, and a selsyn motor system for actuating said member having its transmitting motor on the car and with its rotor adapted to receive angular motion according to variations in the load on the car.

28. In an elevator, the combination of a car, a drum for the car supporting cables, a mechanical brake for the drum, electromagnetic means for opposing the force of the mechanical brake, a circuit for said electromagnetic means including series of resistances respectively for up and down travel of the car, selectors for said series of resistances comprising sets of brushes for connection with the respective series of resistances, movable members for selective contact with said brushes, and means for actuating said members including a selsyn motor system having its transmitting motor on the car and with its rotor adapted to receive angular motion in accordance with variations in the car load.

29. In an elevator, the combination of a car, an electric motor for causing the car to travel in the elevator hatchway, an electric circuit for the motor, a dynamic brake for the motor including a circuit shunted across the motor armature, series of resistances for said circuit respectively for up and down travel of the car, selectors comprising series of brushes connected to said resistances, and members movable for selective contact with said brushes, and a selsyn motor system having its transmitting motor on the car and with its rotor adapted to receive angular motion according to variations in the load on the car.

30. In an elevator, the combination of a car, weighing means on the car, an electric motor for causing the car to travel in the elevator hatchway, a dynamic brake for the motor including a circuit shunted across the motor armature, series of resistances for said circuit respectively for up and down travel of the car, selectors comprising series of brushes connected to said resistances, and movable members for contact with said brushes, and a selsyn motor system for actuating said members having its transmitting motor mounted on the car and with its rotor connected to receive angular motion from the weighing means.

31. In an elevator, the combination of a car, an electric motor for causing the car to travel in the elevator hatchway, and means for regulating an operation of the car including a selsyn motor system having its transmitting motor on the car and its rotor operable in accordance with variations in the load on the car.

32. In an elevator, the combination of a car, an electric motor for causing the car to travel in the elevator hatchway, and means for regulating an operation of the car including a weighing machine on the car, a selsyn motor system having its transmitting motor on the car, and means for imparting angular motion to the selsyn motor rotor from the weighing machine.

33. In an elevator, the combination of a car, an electric motor for causing the car to travel in the elevator hatchway, and means for regulating operation of said motor including a selsyn motor system having transmitting and receiving motors, said transmitting motor being mounted on the car and said receiving motor being stationarily mounted and conductors connecting said motors.

34. In an elevator, the combination of a car, an electric motor for causing the car to travel in the elevator hatchway, and means for regulating operation of the motor including a selsyn motor system having a transmitting motor and a receiving motor, one mounted on the car and the other stationarily mounted, the rotor of the transmitting motor being adapted to receive angular motion in accordance with variations in the load on the car, and the rotor of the receiving motor adapted to receive corresponding angular motion.

JOSEPH R. JACKSON, Jr.